US010839289B2

(12) United States Patent
Katayama (10) Patent No.: US 10,839,289 B2
(45) Date of Patent: Nov. 17, 2020

(54) NEURAL NETWORK PROCESSING WITH VON-NEUMANN CORES

(71) Applicant: INTERNATIONAL BUSINESS MACHINES CORPORATION, Armonk, NY (US)

(72) Inventor: Yasunao Katayama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 953 days.

(21) Appl. No.: 15/141,264

(22) Filed: Apr. 28, 2016

(65) Prior Publication Data

US 2017/0316306 A1 Nov. 2, 2017

(51) Int. Cl.
G06N 3/063 (2006.01)
G06N 3/04 (2006.01)

(52) U.S. Cl.
CPC .......... G06N 3/063 (2013.01); G06N 3/049 (2013.01)

(58) Field of Classification Search
None
See application file for complete search history.

(56) References Cited

U.S. PATENT DOCUMENTS

| 4,974,169 | A | * | 11/1990 | Engel | ................ G06N 3/04 706/42 |
| 5,515,477 | A | * | 5/1996 | Sutherland | ........... G06K 9/6232 706/41 |
| 5,612,865 | A | | 3/1997 | Dasgupta | |
| 5,835,742 | A | * | 11/1998 | James | ................ G06F 13/4036 710/310 |
| 6,295,571 | B1 | | 9/2001 | Scardamalia et al. | |
| 6,512,757 | B1 | * | 1/2003 | Niegel | ................ G06F 15/8053 370/333 |
| 6,654,730 | B1 | * | 11/2003 | Kato | ................ G06N 3/10 706/22 |
| 6,879,518 | B1 | | 4/2005 | Curry | |
| 7,334,100 | B2 | | 2/2008 | Kobayashi et al. | |
| 7,571,270 | B1 | | 8/2009 | Nemirovsky et al. | |

(Continued)

OTHER PUBLICATIONS

Neil et al. (Minitaur, an Event-Driven FPGA-Based Spiking Network Accelerator, Dec. 2014, pp. 2621-2628) (Year: 2014).*

(Continued)

*Primary Examiner* — George Giroux
(74) *Attorney, Agent, or Firm* — Tutunjian & Bitetto, P.C.

(57) ABSTRACT

A neural network processing system includes one source node having a source memory and a source core, and one destination node having a destination memory and a destination core, the source core and the destination core being von-Neumann cores, the destination memory including weight data storage areas for storing weight data corresponding to each node, an accumulation memory for accumulating the weight data, and an event address memory, the destination core identifying the weight data storage area and accumulating the weight data to store the accumulated weight data in the accumulation memory, the source memory including a data set having first information for identifying the destination node and second information for identifying the weight data storage area, and the source core reading the data set and sending the second information in the data set to the destination node to conduct remote memory write.

13 Claims, 8 Drawing Sheets

(56) References Cited

U.S. PATENT DOCUMENTS

| | | | |
|---|---|---|---|
| 7,583,588 B2 | 9/2009 | Bowes et al. | |
| 8,145,817 B2 | 3/2012 | Detlefs et al. | |
| 9,432,298 B1* | 8/2016 | Smith | H04L 49/9057 |
| 9,648,102 B1* | 5/2017 | Davis | H04L 67/1097 |
| 2003/0093524 A1 | 5/2003 | Goldick | |
| 2003/0126200 A1 | 7/2003 | Wolff | |
| 2004/0117563 A1 | 6/2004 | Wu et al. | |
| 2005/0235134 A1 | 10/2005 | O'Sullivan | |
| 2006/0212573 A1 | 9/2006 | Loaiza et al. | |
| 2006/0218556 A1 | 9/2006 | Nemirovsky et al. | |
| 2007/0294496 A1 | 12/2007 | Goss et al. | |
| 2008/0319933 A1* | 12/2008 | Moussa | G06N 3/063 706/31 |
| 2009/0106495 A1* | 4/2009 | Chou | G06F 9/3004 711/130 |
| 2009/0240860 A1 | 9/2009 | Coon et al. | |
| 2011/0106741 A1* | 5/2011 | Denneau | H04L 47/521 706/25 |
| 2012/0221671 A1 | 8/2012 | Chen et al. | |
| 2013/0191838 A1 | 7/2013 | Hoffman et al. | |
| 2013/0254510 A1* | 9/2013 | Brehmer | G06F 3/0629 711/170 |
| 2014/0250037 A1 | 9/2014 | Izhikevich et al. | |
| 2015/0074026 A1 | 3/2015 | Szatmary et al. | |
| 2015/0106314 A1* | 4/2015 | Birdwell | G06N 3/02 706/25 |
| 2016/0196488 A1* | 7/2016 | Ahn | G06N 3/049 706/41 |
| 2016/0364644 A1* | 12/2016 | Brothers | G06N 3/049 |
| 2017/0277628 A1* | 9/2017 | Paul | G06F 12/06 |

OTHER PUBLICATIONS

Wang et al. (FPGA-based neuromorphic computing system with a scalable routing network, Oct. 2015, pp. 1-4) (Year: 2015).*
Indiveri, G. et al., "Memory and information processing in neuromorphic systems," Proceedings of the IEEE, Jun. 2015. (pp. 1-17).
Notice of Allowance with cited art in corresponding U.S. Appl. No. 15/281,239 dated Aug. 28, 2018.
U.S. Office Action issued in U.S. Appl. No. 15/480,027 dated Feb. 4, 2019, 9 pages.

* cited by examiner

NEURAL NETWORK PROCESSING WITH VON-NEUMANN CORES

BACKGROUND

Technical Field

The present invention relates to neural network processing, and more specifically, to neural network processing using von-Neumann cores.

Description of the Related Art

Recently, various brain-inspired system implementations, both based on von-Neumann and non-von-Neumann architectures have been explored. However, existing von-Neumann implementations require frequent remote memory and IO (input/output) communications to exchange and arbitrate event messages, and result in significant overheads in performance and power consumption. Existing non-von-Neumann implementations may have difficulty in building a brand-new ecosystem and flexibly supporting various learning algorithms.

There is a need for event-driven neural networks that are emulated on von-Neumann platforms and existing memory network fabric by directly mapping spike events onto low-latency memory access events.

SUMMARY

According to an embodiment, a neural network processing system including a plurality of nodes having at least one source node and at least one destination node is provided. The source node includes a source memory and a source core. The destination node includes a destination memory and a destination core. The source core and the destination core are von-Neumann cores. The destination memory includes one or more weight data storage areas for storing weight data corresponding to each node accessing the destination memory, an accumulation memory for storing an accumulated weight data, and an event address memory. The destination core identifies the weight data storage area corresponding to the source node based on information written to the event address memory, and accumulates the weight data to store the accumulated weight data in the accumulation memory. The source memory includes a data set having first information for identifying the destination node and second information for identifying the weight data storage area corresponding to the source node. If a predetermined event occurs, the source core reads the data set from the source memory and sends the second information in the data set to the destination node to conduct noncoherent remote memory write to the event address memory in the destination memory.

According to another embodiment, a neural network processing system including a plurality of nodes is provided. Each node includes a von-Neumann core and a memory. The memory includes one or more weight data storage areas for storing weight data corresponding to each node accessing the memory, an accumulation memory for storing an accumulated weight data, an event address memory, and a written data storage area for storing a data set having first information for identifying one of the plurality of nodes and second information for identifying the weight data storage area corresponding to the own node. The core identifies the weight data storage area, based on information written to the event address memory, corresponding to another one of the plurality of nodes having sent the information, and accumulates the weight data to store the accumulated weight data in the accumulation memory. If the accumulated weight data stored in the accumulation memory reaches a predetermined threshold, the core reads the data set from the memory and sends the second information in the data set to conduct noncoherent remote memory write to the event address memory in the one of the plurality of nodes.

According to another embodiment, a neural network processing system including a plurality of nodes including at least one node including a plurality of cores and a memory is provided. The plurality of cores includes a first core and a second core being von-Neumann cores. The memory includes one or more weight data storage areas for storing weight data corresponding to each core, an accumulation memory for storing an accumulated weight data, an event address memory for each core, and a written data storage area for storing information for identifying each core. The first core sends information for identifying the first core to the event address memory. The second core identifies the weight data based on information written to the event address memory, and accumulates the weight data to store the accumulated weight data in the accumulation memory. If the accumulated weight data stored in the accumulation memory reaches a predetermined threshold, the second core reads the information for identifying the second core and conducts noncoherent remote memory write to the event address memory for the second core.

DETAILED DESCRIPTION

Hereinafter, exemplary embodiments of the present invention will be described in detail with reference to the attached drawings.

It should be noted that the present invention is not limited to these exemplary embodiments to be given below and may be implemented with various modifications within the scope of the present invention. In addition, the drawings used herein are for purposes of illustration, and may not show actual dimensions.

Figure 1:
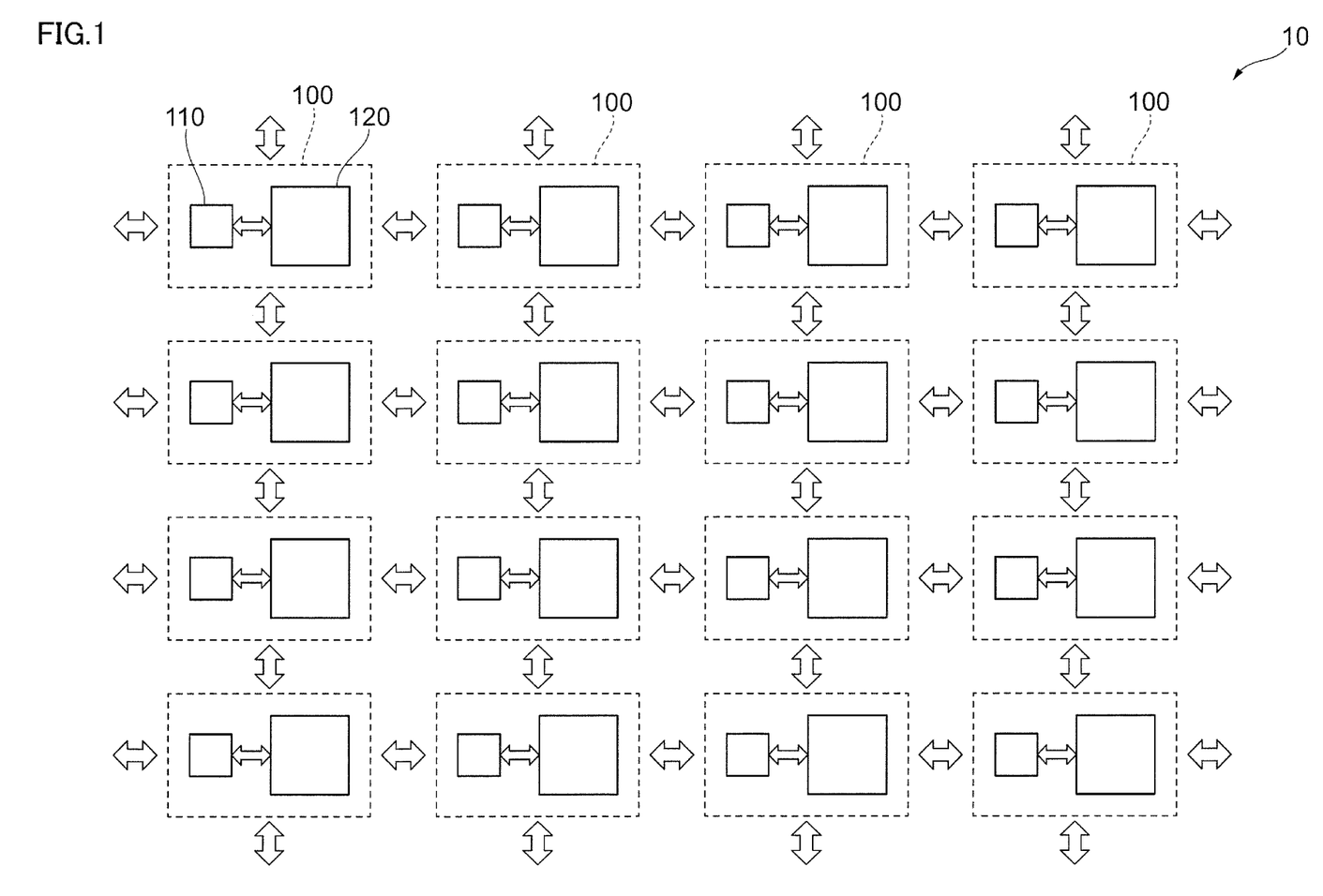
FIG. 1 is a bloc/flow diagram of a neural network processing system according to an embodiment of the present invention.

FIG. 1 is a block diagram of a neural network processing system 10 according to an embodiment of the present invention. As shown in FIG. 1, the neural network processing system 10 may include multiple nodes 100 connected to each other. Each node 100 may include a core 110 and a memory 120. The core 110 is a von-Neumann (stored program) core. The memory 120 acts as a main memory for the core 110.

The neural network processing system 10 is an event-driven neural network processing system using Massively-Parallel von-Neumann cores. The neural network processing system 10 is so-called a spiking neural network system within a framework of von-Neumann-based noncoherent shared memory architecture.

The core 110 in each node 100 is capable of accessing the memory 120 (local memory) in the own node 100, and also capable of accessing the memories 120 (remote memories) in the other nodes 100. That is to say, the memory 120 in each node 100 may be accessed by the core 110 in the own node 100, and by the cores 110 in the other nodes 100.

If a firing event, as an example of the predetermined event, occurs in the node 100 in the neural network processing system 10, in other words, if a neuron at the node 100 fires, that node 100 (e.g., source node 100) outputs (e.g., transmits) a signal to another node 100 (e.g., destination node 100). This output allows for the core 110 in the source node 100 to write data to the memory 120 in the destination node 100.

Each node 100 acts as the source node 100 in some cases, and also acts as the destination node 100 in other cases. If the destination node 100 receives the signal from the source node 100 to satisfy a specific condition, another firing event occurs and the destination node 100 then acts as the source node 100 to output the signal to still another node 100 (e.g., another destination node 100). Hereinafter, the source node 100 and the destination node 100 may be referred to as the source node 100S and the destination node 100D, respectively.

As mentioned above, in the neural network processing system 10 of this embodiment, the memory 120 in each node 100 may be accessed by the core 110 in its own node 100, and by the cores 110 in the other nodes 100. Thus, event handling for memory consistency is required if a single memory 120 is accessed by multiple cores 110 at the same time, namely if multiple write accesses are simultaneously requested to the single memory 120.

In this embodiment, causal consistency is required for the memory 120, which is a shared memory. The causal consistency only requires that causal (not concurrent) read/writes are preserved. This allows for event handling by the shared memory for multiple accesses from the multiple cores 110.

As mentioned above, in the neural network processing system 10 of this embodiment, each node 100 may act as the source node 100 and the destination node 100. That is to say, each node 100 has both functions of the source node 100S and the destination node 100D. Hereinafter, these functions will be described in detail.

Figure 2:
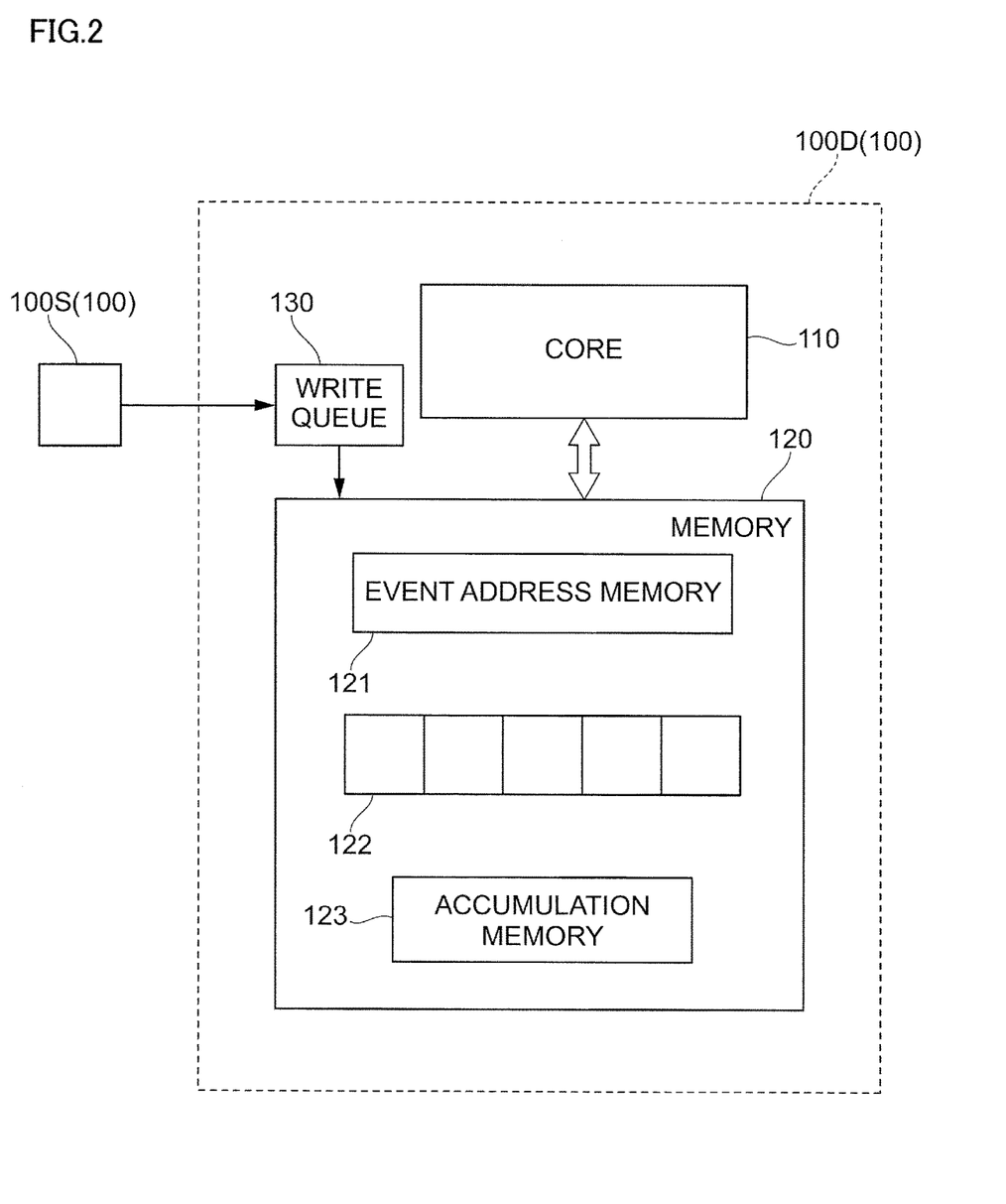
FIG. 2 is a block/flow diagram of the node acting as the destination node.

FIG. 2 is a block diagram of the node 100 acting as the destination node 100D. As shown in FIG. 2, the memory 120, as an example of the destination memory, in the destination node 100D may include an event address memory 121 as a specific storage area. To this event address memory 121, noncoherent remote memory write is conducted based on the signal sent from another node 100 (e.g., source node 100S).

The event address memory 121 may be provided with a write lock mechanism. This write lock mechanism may arbitrate the above mentioned simultaneous write accesses to the single memory 120. More specifically, the event address memory 121 is locked (e.g., write protected) if the event address memory 121 is subjected to a remote memory write from the source node 100S. The event address memory 121 is then unlocked (e.g., write permitted) if the contents in the event address memory 121 are subjected to a local memory read by the core 110, as an example of the destination core, of the destination node 100D. For example, the event address memory 121 includes a lock bit indicating a lock condition (e.g., write permitted/write protected). The value of the bit is changed if the write process or the read process is conducted. For example, when the lock bit is enabled, namely when the event address memory 121 is in the write protected condition, the value of the bit is set to 1. When the lock bit is disabled, namely when the event address memory 121 is in the write permitted condition, the value of the bit is set to 0.

The memory 120 in the destination node 100D may include a weight data storage area 122. The weight data storage area 122 corresponds to one source node 100S which is capable of sending the signal to the destination node 100D. The weight data stored in the weight data storage area 122 represents connection strength between the destination node 100D and the corresponding source node 100S.

As shown in FIG. 2, multiple weight data storage areas 122 may be arranged in the specific address area (e.g., control area) of the memory 120. Each weight data storage area 122 corresponds to a specific source node 100S. The weight data storage area 122 corresponding to the specific source node 100S may be identified by an offset address expressed by, for example, "base address+offset," or by a sequence number expressed by, for example, "base address+sequence number of the subject weight data storage area 122."

If the destination node 100D receives the signal from a specific node 100 (e.g., source node 100S) repeatedly, the weight data in the weight data storage area 122 corresponding to the specific node 100 is updated according to a predetermined rule. More specifically, if the destination node 100D receives the signal from the specific node 100 repeatedly, the value of the weight data in the corresponding weight data storage area 122 increases. That is to say, the weight data in the corresponding weight data storage area 122 will be updated based on the frequency of access from the specific source node 100S.

The memory 120 in the destination node 100D may include an accumulation memory 123. The accumulation memory 123 is a storage area for accumulated weight data. The weight data to be accumulated is the data stored in the one or more weight data storage areas 122 corresponding to the source node 100S. Every time the destination node 100D receives the signal from the source node 100S, the core 110 in the destination node 100D accumulates the weight data in the weight data storage area 122 to store the accumulated weight data in the accumulation memory 123.

The core 110 in the destination node 100D executes the following process according to computer programs. If data is written (e.g., updated) in the event address memory 121, the core 110 reads the data from the event address memory 121 to unlock the event address memory 121. Note that the configuration allowing the core 110 to detect the event that data has been written in the event address memory 121 will be described later.

Based on the data read from the event address memory 121, the core 110 identifies the weight data storage area 122 corresponding to the source node 100S. The core 110 then accumulates the weight data in the identified weight data storage area 122 to store the accumulated weight data in the accumulation memory 123. The core 110 updates the weight data in the identified weight data storage area 122 if a predetermined condition is satisfied. The core 110 generates a firing event if the accumulated weight data reaches a predetermined threshold. This causes the destination node 100D to be the source node 100S regarding the new fire-triggered event.

The destination node 100D may include a write queue 130 external to the memory 120. When the lock bit in the event address memory 121 is enabled, the write queue 130 stores subsequent write accesses to the event address memory 121. Every time the lock bit in the event address memory 121 is disabled, one write access stored in the write queue 130 is executed.

In this embodiment, a set of functions of a single event address memory 121, a single or multiple weight data storage areas 122, a single accumulation memory 123, and a single core 110 corresponds to a single neuron. A single or multiple function sets may be included in a single node 100.

It should be noted that multiple sets of the single event address memory 121, the single or multiple weight data storage areas 122, and the single accumulation memory 123 may be included (e.g., replicated) in the memory 120 so that the memory 120 may correspond to multiple neurons. That is, the core 110 may be designed to perform as a single or multiple neurons.

It should also be noted that, if the set of the single core 110 and the single memory 120 performs as the multiple neurons, the memory 120 may include multiple storage areas for the set of the event address memory 121, the weight data storage area 122, and the accumulation memory 123. The number of the storage areas may correspond to the number of the neurons.

It should also be noted that the accumulated weight data in the accumulation memory 123 can be cached. This enables the core 110 to avoid frequent access to the memory 120.

Figure 3A:
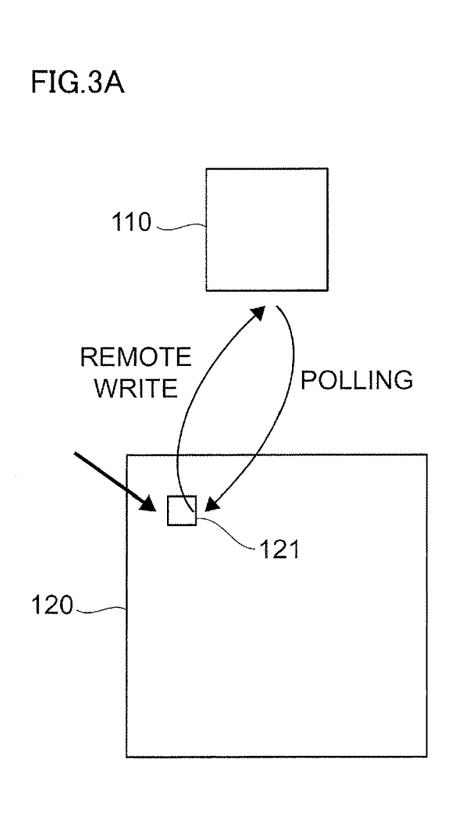
FIGS. 3A to 3C are examples of a configuration allowing the core to detect an event that data has been written in the event address memory.
Figure 3B:
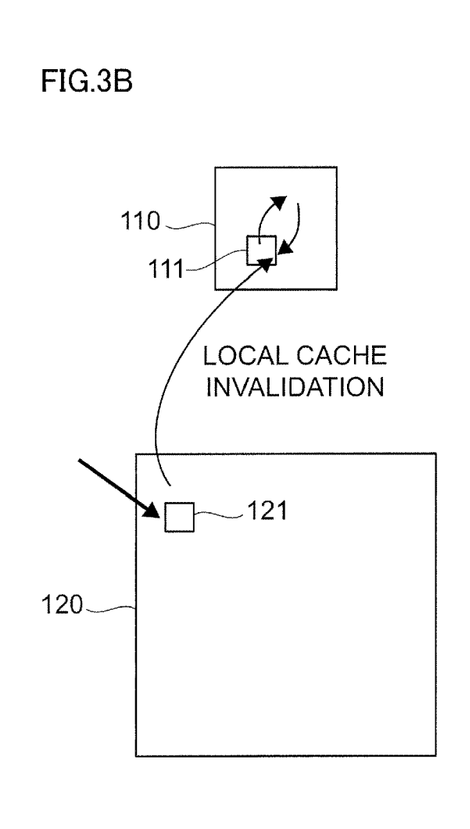
Figure 3C:
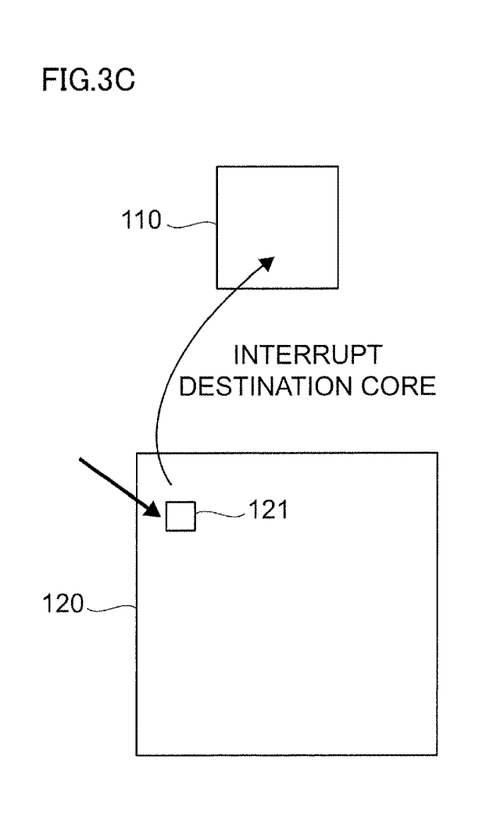

FIGS. 3A to 3C are examples of a configuration allowing the core 110 to detect the event that the data has been written in the event address memory 121. If the data is written in the event address memory 121 of the memory 120 in the destination node 100D, the core 110 in the destination node 100D selects the weight data storage area 122 to accumulate the weight data based on the contents of the written data. Accordingly, the core 110 is required to promptly detect the event that the data has been written in the event address memory 121. In the first example shown in FIG. 3A, the core 110 constantly monitors the event address memory 121 by polling. Note that this example may require an expense of power and bandwidth (BW) overheads for the continuous access to the memory 120, which is not an on-chip memory (e.g., an off-chip memory) for the core 110.

Alternatively, in the second example shown in FIG. 3B, the core 110 may store the contents of the event address memory 121 in a cache memory 111, which is an on-chip memory for the core 110. In this example, the core 110 reads the cache memory 111 by polling. If the contents of the event address memory 121 are rewritten, the corresponding cache data in the cache memory 111 will be invalidated by an operation from the memory 120. Note that the rewritten contents are an example of the new data. The second example may reduce polling overhead by reading the cache memory 111 and avoiding unnecessary read access to the memory 120, as compared to the first example shown in FIG. 3A. Since the above cache data invalidation function is used in the existing cache system, no new function needs to be added.

In the third example shown in FIG. 3C, if the contents of the event address memory 121 are rewritten, the memory 120 interrupts the process of the core 110 to kick off the weight data accumulation process. This example requires a controller in the memory 120 for an interrupting mechanism, so that a new hardware design is required. The third example can reduce polling overheads, similarly to the second example shown in FIG. 3B. Note that the second example shown in FIG. 3B may be easiest to introduce to the node 100 among the above three examples.

Figure 4:
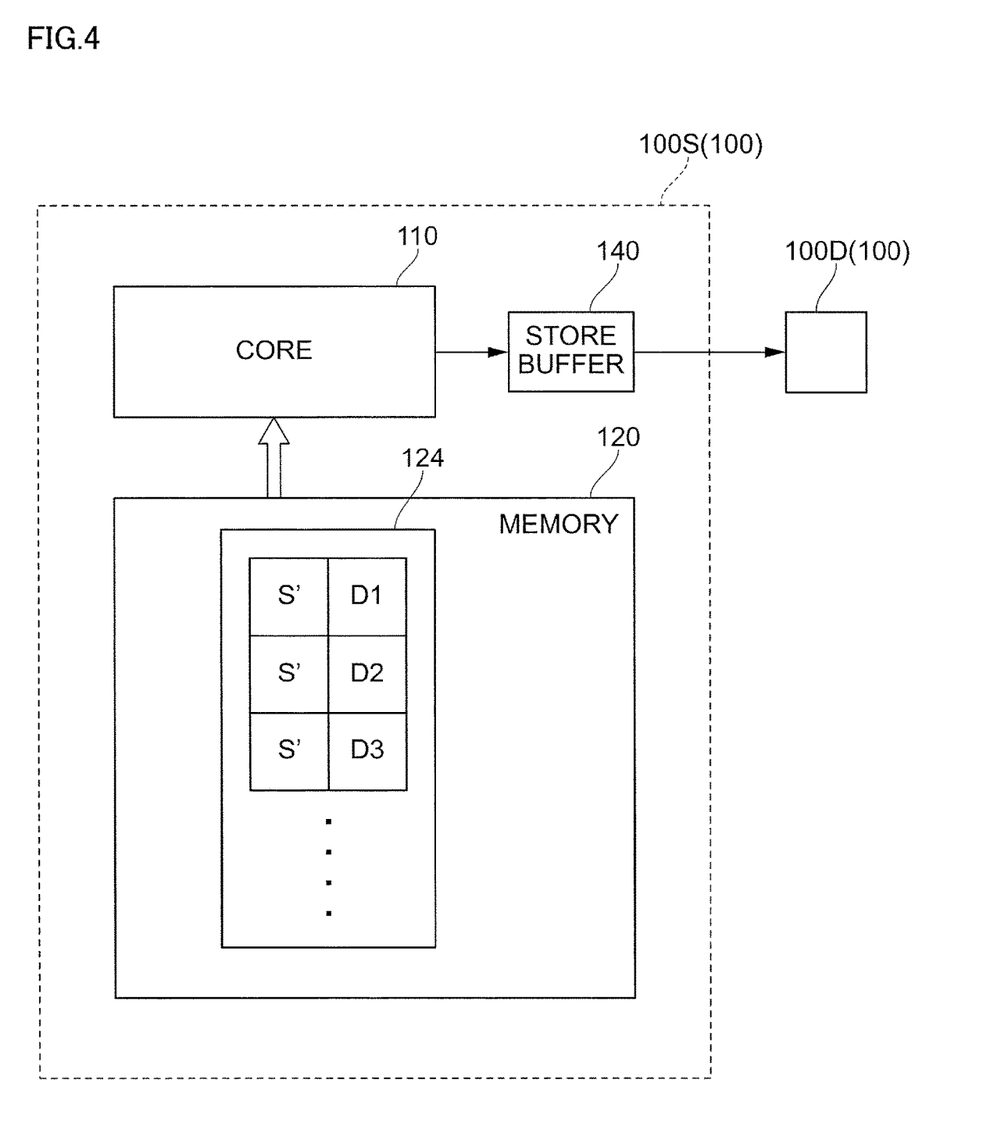
FIG. 4 is a block/flow diagram of the source node.

FIG. 4 is a block/flow diagram of the source node 100S. As shown in FIG. 4, the memory 120, as an example of the source memory, in the source node 100S may include a written data storage area 124 for storing one or more data sets. Each data set is prepared for the corresponding destination node 100D to which the signal is sent if a firing event occurs in the source node 100S. The data set contains data S' and an address Dn (n=1, 2, 3 . . . ). The data S' represents subject data to be sent. The data S', as an example of the second information, contains information to identify the weight data storage area 122, corresponding to the source node 100S, of the memory 120 in the destination node 100D. This information may be referred to as "encoded source node information." The address Dn, as an example of the first information, represents the address of the destination node 100D to which the data S' is sent.

Note that, as mentioned above referring to FIG. 2, upon receiving the data S' from the source node 100S, the destination node 100D identifies the weight data storage area 122 corresponding to the source node 100S, which has sent the data S' to the destination node 100D, to accumulate the weight data. Accordingly, the data S' may contain information that enables the core 110 in the destination node 100D to directly identify the weight data storage area 122 corresponding to the source node 100S based on the data S'. In other words, the data S' enables the core 110 in the destination node 100D to calculate an address pointer of the weight data storage area 122. This eliminates the need for source address search based on modified source address information.

For example, the data S' may be the data of the address of the weight data storage area 122, corresponding to the source node 100S, of the memory 120 in the destination node 100D, and may be expressed by "base address+offset." In another example, the data S' may be the data expressed by "base address+sequence number of the subject weight data storage area 122." More specifically, the data S' may be defined as indicating the location of the subject weight data storage area 122 among the weight data storage areas 122 in the memory 120 of the destination node 100D. The data S' described with the above expressions enables the core 110 in the destination node 100D to directly identify the weight data storage area 122 corresponding to the source node 100S based on the data S'.

If a firing event occurs in the source node 100S, the core 110, as an example of the source core, in the source node 100S reads the data set stored in the memory 120 to send the data S' in the read data set to the destination node 100D identified by the address Dn in the read data set. Here, each node 100 may include a store buffer 140. The data sent from the core 110 is temporarily stored in the store buffer 140 before being sent to the destination node 100D.

Figure 5:
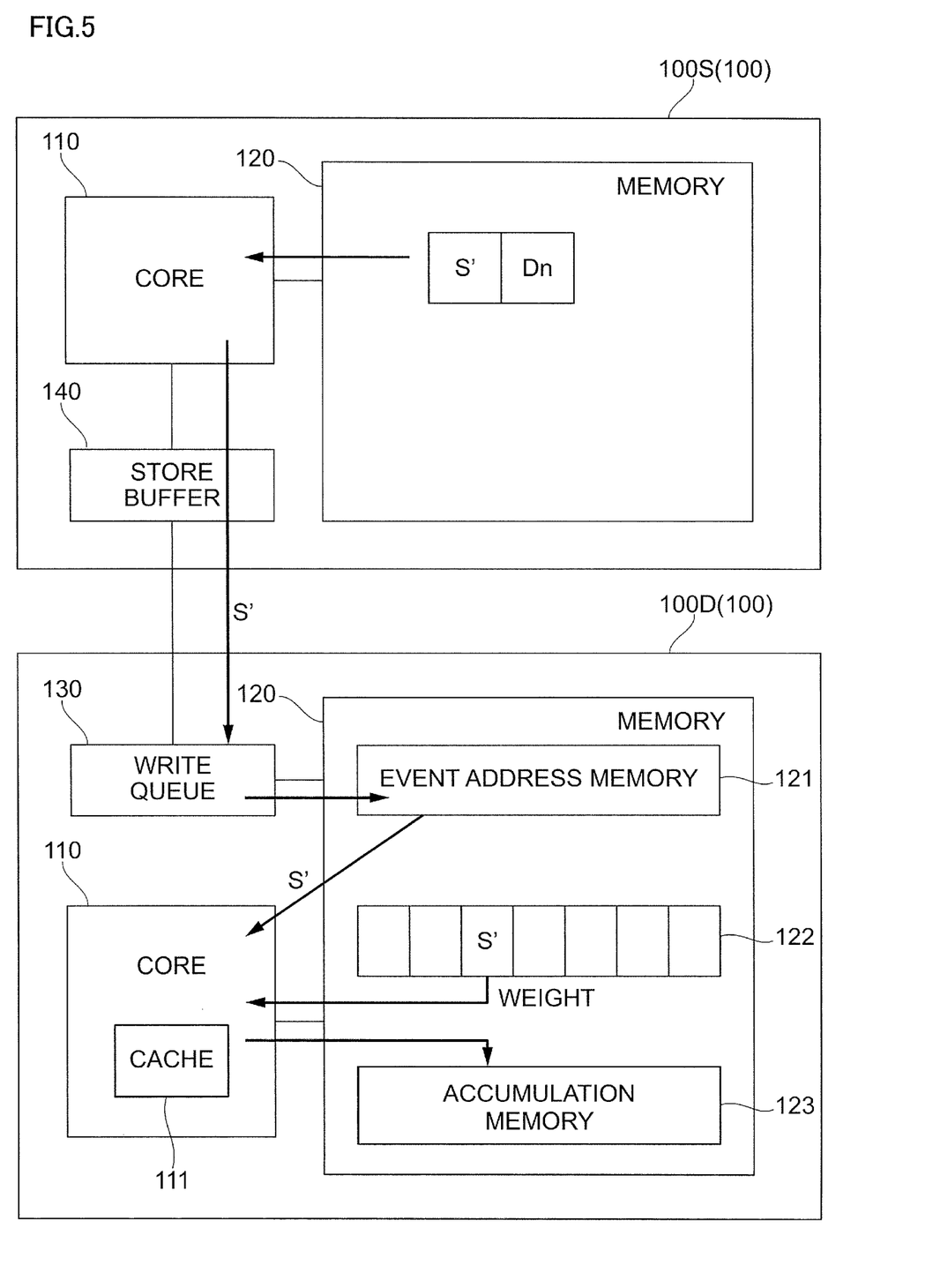
FIG. 5 depicts a communication between the source node and the destination node.

FIG. 5 depicts a communication between the source node 100S and the destination node 100D. As shown in FIG. 5, if a firing event occurs in the source core 100S, the core 110 of the source node 100S sends the data S' to the destination node 100D based on the data set stored in the memory 120 of the source node 100S. The sent data S' may be temporarily stored in the write queue 130 before being written in the event address memory 121 in the destination node 100D.

Figure 6:
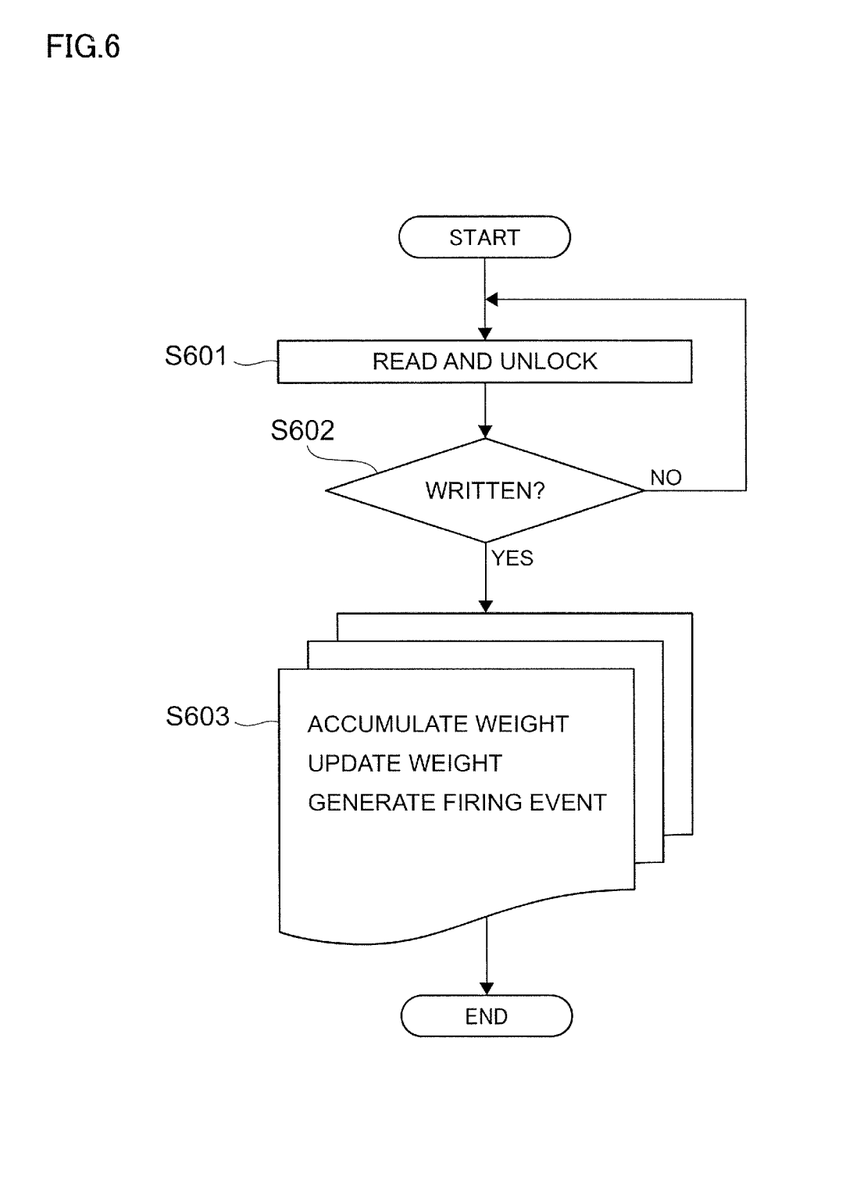
FIG. 6 is a flowchart of the operation of the core in the destination node.

FIG. 6 is a flowchart of the operation of the core 110 in the destination node 100D. As shown in FIG. 6, the core 110 in the destination node 100D reads (e.g., fetches) the event address memory 121 (step 601). Here, any of the above three examples shown in FIGS. 3A to 3C may be applicable to the core 110 for detecting the event that data has been written in the event address memory 121. For example, in the case of applying the second example shown in FIG. 3B, the core 110 reads the cache memory 111 by polling. Upon detecting invalidated cache data, the core 110 accesses the memory 120 to read the corresponding data in the event address memory 121. The core 110 unlocks the event address memory 121 upon reading the data from the event address memory 121 (step 601).

Then, the core 110 determines whether the data in the event address memory 121 is written or updated (step 602). If the event address memory 121 is not written (No in step 602), the core 110 returns to step 601. If the event address memory 121 is written (Yes in step 602), the core 110 executes a process according to the written contents in the event address memory 121. In other words, the core 110 executes weight-related procedures according to the communication from the source node 100S (step 603). More specifically, the core 110 accumulates the weight data corresponding to the source node 100S to store the accumulated weight data in the accumulation memory 123. The core 110 also updates the weight data if a predetermined condition is satisfied. The core 110 also generates a firing event if the accumulated weight data reaches the predetermined threshold. Upon finishing the above operation, the core 110 returns to step 601.

In this embodiment, each node 100 may act as the source node 100 and the destination node 100, in principle. Here, if multicast communication among the nodes 100 is required, one of the nodes 100 may act as an intermediate node. Hereinafter, such intermediate node may be referred to as an intermediate node 100I to distinguish it from the source node 100S and the destination node 100D.

Figure 7:
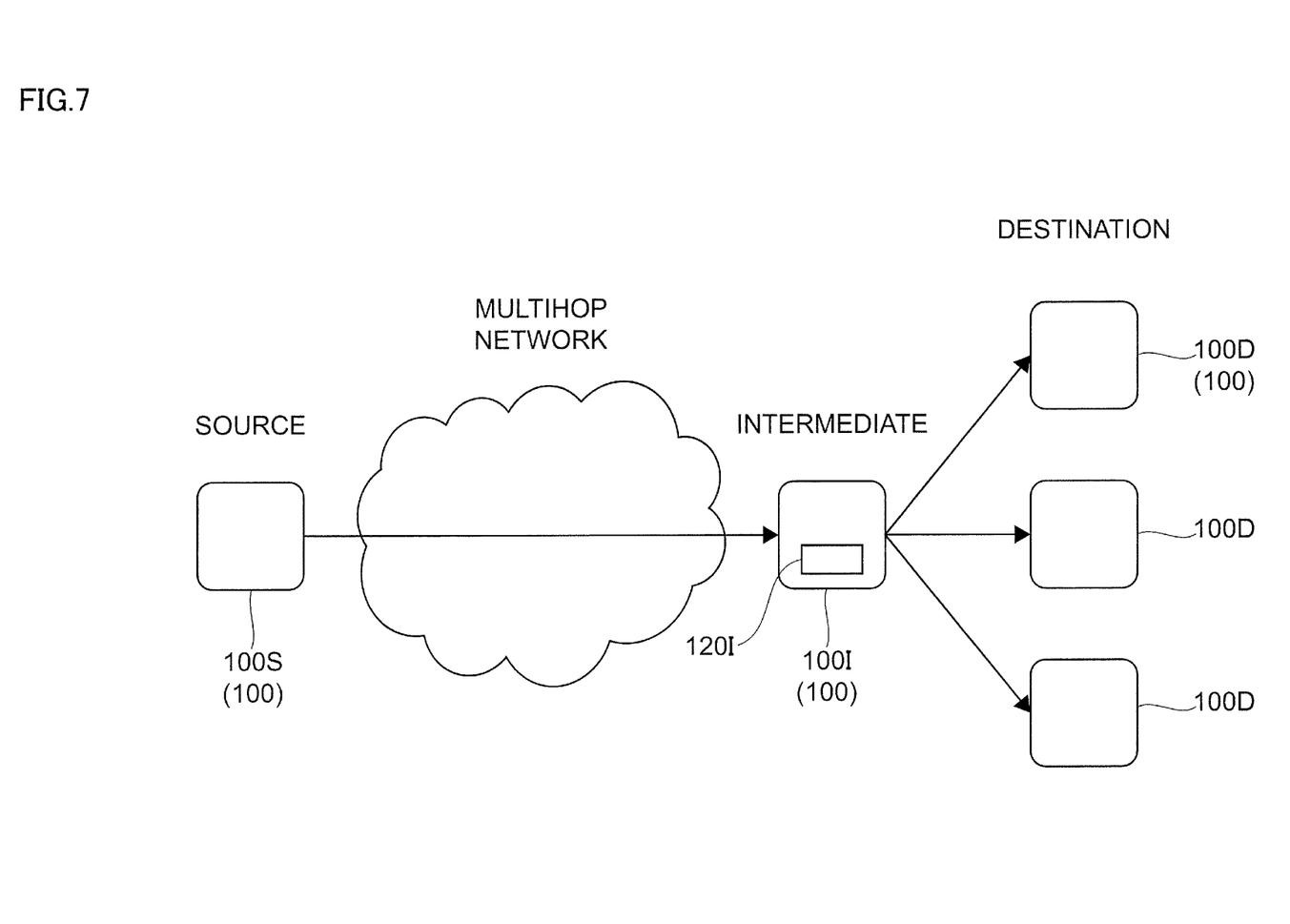
FIG. 7 depicts a configuration for multicast communication.

FIG. 7 depicts a configuration for multicast communication according to the embodiment. The configuration shown in FIG. 7 includes the intermediate node 100I besides the source node 100S and the destination nodes 100D. The intermediate node 100I may include an intermediate storage area 120I for storing information sent from the source node 100S. The intermediate node 100I may mediate between the source node 100S and the destination nodes 100D, and also act as the destination node 100D in this communication. In the configuration shown in FIG. 7, if a firing event occurs, the source node 100S sends the signal to the intermediate node 100I via the multihop network. Upon receiving the signal, the intermediate node 100I promptly sends the signal to the destination nodes 100D on a post-stage. This configuration enables the source node 100S to write data to the multiple memories 120 in the destination nodes 100D by sending the signal to the single intermediate node 100I. In this configuration, the source node 100S may only store a data set corresponding to the intermediate node 100I to which the signal is to be sent in the firing event. In other words, the source node 100S is not required to store multiple data sets corresponding to the multiple destination nodes 100D.

In the above embodiment, one node 100 includes one core 110 and one memory 120. As an alternative embodiment, each node 100 constituting the neural network processing system 10 (shown in FIG. 1) may include multiple cores 110 and one memory 120. In this configuration, the memory 120 is shared by the multiple cores 110 in the single node 100. Thus, similarly to the writing process from another node 100, the writing process to the event address memory 121 is conducted if one of the cores 110 writes data to the memory 120 in the own node 100.

Figure 8:
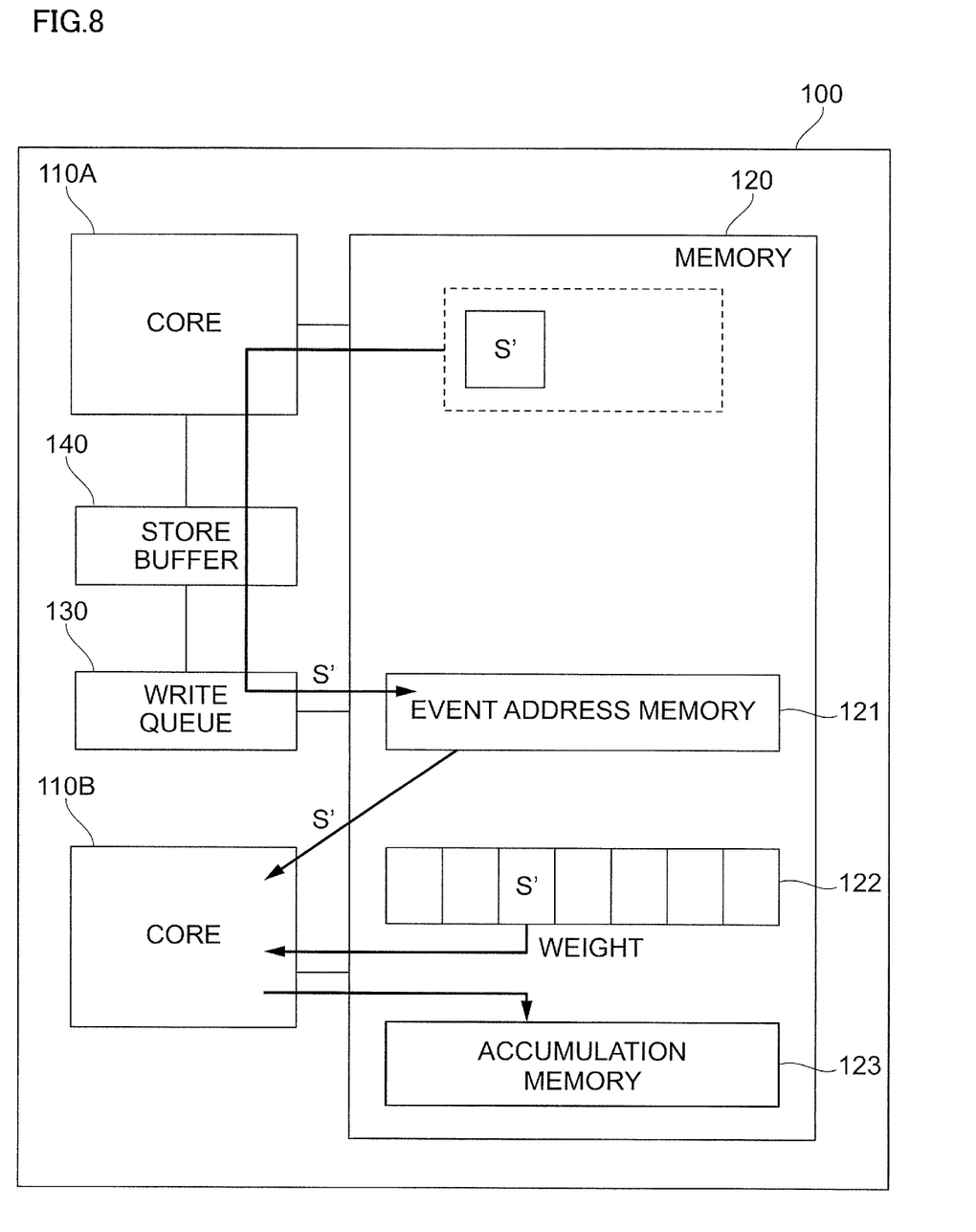
FIG. 8 is a block/flow diagram of the node including two cores.

FIG. 8 is a block/flow diagram of the node 100 including two cores 110A and 110B according to an alternative embodiment. As shown in FIG. 8, the core 110A, as an example of the first core, writes data to the memory 120 and the core 110B, as an example of the second core, executes the process according to the written data in the memory 120. That is to say, the core 110A acts as the core 110 in the source node 100S in the above embodiment, and the core 110B acts as the core 110 in the destination node 100D in the above embodiment. In other words, the node 100 may act as multiple neurons. Each of the core 110A and the core 110B corresponds to each neuron. Note that the core 110B may correspond to the core 110 in the source node 100S, and the core 110A may correspond to the core 110 in the destination node 100D in some cases. Further, if a communication is conducted between the core 110A and core 110B in the node 100, the memory 120 may act as the memory 120 in the source node 100S and also act as the memory 120 in the destination node 100D in the above embodiment.

In the configuration shown in FIG. 8, if a firing event occurs in the core 110A, the core 110A outputs the data S' (e.g., encoded source node information) for identifying the weight data storage area 122 in its own node 100. The output data S' is written to the event address memory 121 in memory 120 via the store buffer 140 and the write queue 130. The event address memory 121 is then locked (e.g., write protected). The core 110B then reads the written data S' in the event address memory 121 and unlocks the event address memory 121. The core 110B then identifies the weight data storage area 122 in the own node 100 to accumulate the weight data.

The core 110B then generates a firing event if the accumulated weight data reaches a predetermined threshold. This causes the core 110B to be the core 100A regarding the new fire-triggered event. That is to say, the core 110B starts the above mentioned process of the core A, for example the core 110B outputs the data S' for identifying the weight data storage area 122 in its own node.

It should be noted that, if no firing event occurs in any source node 110S, the event address memory 121 may contain a value which does not exist in the encoded source node information values (such as −1).

The above framework enables low-cost and mature von-Neumann multicore platforms to efficiently emulate event-driven neural networks and to retain flexible choices of learning algorithms in software. Further, the above framework reduces the memory communication traffic because internode event communications can be handled without arbitration-related operations at the source node 100S.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural network processing system comprising a plurality of nodes including at least one source node and at least one destination node, the source node having a source memory and a source core, the destination node having a destination memory and a destination core, the source core and the destination core each being von-Neumann cores, wherein:
the destination memory is separate from the source memory and includes one or more weight data storage areas to store weight data corresponding to each node accessing the destination memory, an accumulation memory to store an accumulated weight data, and an event address memory;
the destination core identifies the weight data storage area corresponding to the source node based on information written to the event address memory, and accumulates the weight data to store the accumulated weight data in the accumulation memory;
the source memory includes a data set having first information to identify the destination node and second information to identify the weight data storage area corresponding to the source node; and
if a predetermined event occurs, the source core reads the data set from the source memory and sends the second information in the data set to the destination node to conduct a noncoherent remote memory write to the event address memory in the destination memory.

2. The neural network processing system according to claim 1, wherein the predetermined event includes an event that the accumulated weight data stored in the accumulation memory reaches a predetermined threshold.

3. The neural network processing system according to claim 1, wherein:
if the noncoherent memory write is conducted to the event address memory based on a write access from the source node, the event address memory is locked against other write accesses; and
if the information written to the event address memory is read by the destination core, the event address memory is unlocked against the other write accesses.

4. The neural network processing system according to claim 1, wherein:
the source core writes encoded source node information as the second information to the event address memory; and
the destination core reads the weight data corresponding to the source node based on the encoded source node information written to the event address memory.

5. The neural network processing system according to claim 1, wherein:
the destination core stores the information stored in the event address memory in a cache memory; and
the information stored in the cache memory is invalidated if new data is written to the event address memory.

6. The neural network processing system according to claim 1, wherein:
the destination memory includes a controller to access the destination core; and
if new data is written to the event address memory, the controller interrupts a process of the destination core.

7. The neural network processing system according to claim 1, wherein the neural network processing system performs as a spiking neural network.

8. The neural network processing system according to claim 1, wherein:
the plurality of nodes includes at least one intermediate node that mediates communication between the source node and the destination node;
the intermediate node includes an intermediate storage area to store information sent from the source node; and
a core in the intermediate node sends the information stored in the intermediate storage area to the destination node to conduct the noncoherent remote memory write to the event address memory in the destination memory.

9. The network processing system according to claim 1, wherein each node of the plurality of nodes is configured to perform both functions of the source node and the destination node.

10. A neural network processing system comprising a plurality of nodes, each node including a von-Neumann core and a memory, wherein:
the memory is separate from a memory of others of the plurality of nodes and includes one or more weight data storage areas to store weight data corresponding to each node accessing the memory, an accumulation memory to store an accumulated weight data, an event address memory, and a written data storage area to store a data set having first information for identifying one of the plurality of nodes and second information for identifying the weight data storage area corresponding to a respective node;
the von-Neumann core identifies the weight data storage area, based on information written to the event address memory, corresponding to another one of the plurality of nodes having sent the information, and accumulates the weight data to store the accumulated weight data in the accumulation memory; and
if the accumulated weight data stored in the accumulation memory reaches a predetermined threshold, the von-Neumann core reads the data set from the memory and sends the second information in the data set to conduct a noncoherent remote memory write to the event address memory in the one of the plurality of nodes.

11. A neural network processing system comprising a plurality of nodes including at least one node including a plurality of cores and each of the nodes includes a memory, wherein:
the plurality of cores includes a first core and a second core being von-Neumann cores;
the memory of each of the plurality of nodes is separate from a memory of others of the plurality of nodes and includes one or more weight data storage areas to store weight data corresponding to each core, an accumulation memory to store an accumulated weight data, an event address memory for each core, and a written data storage area to store information for identifying each core;
the first core sends the information for identifying the first core to conduct a noncoherent remote memory write to the event address memory;
the second core identifies the weight data based on the information written to the event address memory, and accumulates the weight data to store the accumulated weight data in the accumulation memory; and
if the accumulated weight data stored in the accumulation memory reaches a predetermined threshold, the second core sends the information for identifying the second core to conduct the noncoherent remote memory write to the event address memory.

12. The neural network processing system according to claim 11, wherein:

if the noncoherent remote memory write is conducted to the event address memory based on a write access from the first core, the event address memory is locked against other write accesses; and if the information written to the event address memory is read by the second core, the event address memory is unlocked against the other write accesses.

13. The neural network processing system according to claim 11, wherein:

the first core writes encoded source node information for identifying the first core to the event address memory; and the second core reads the weight data corresponding to the first core based on the encoded source node information written to the event address memory.

\* \* \* \* \*